(12) United States Patent
Dau et al.

(10) Patent No.: US 6,457,572 B1
(45) Date of Patent: Oct. 1, 2002

(54) DOUBLE CLUTCH ASSEMBLY

(75) Inventors: Andreas Dau, Würzburg (DE); Andreas Orlamünder, Schweinfurt (DE); Reinhard Feldhaus, Ebenhausen (DE); Jörg Randow, deceased, late of Stammheim (DE), by Anke Randow, legal representative; Gerhard Röll, Eisenheim (DE); Bernhard Schierling, Kürnach (DE); Michael Peterseim, Bergrheinfeld (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/826,248

(22) Filed: Apr. 4, 2001

(30) Foreign Application Priority Data

Apr. 4, 2000 (DE) ......................... 100 16 607

(51) Int. Cl.$^7$ .............................................. F16D 21/02
(52) U.S. Cl. ................. 192/48.91; 192/48.9; 192/70.25
(58) Field of Search ............................ 192/48.8, 48.9, 192/48.91, 70.25, 89.23, 109 A, 111 A

(56) References Cited

U.S. PATENT DOCUMENTS

| 4,238,019 | A | * | 12/1980 | Maucher et al. | ............ 192/48.8 |
| 4,741,227 | A | * | 5/1988 | Yamada et al. | ............. 188/290 |
| 4,787,492 | A | * | 11/1988 | Ball et al. | ................... 192/48.8 |
| 5,984,067 | A | * | 11/1999 | Weidinger et al. | ........ 192/111 A |
| 6,276,504 | B1 | * | 8/2001 | Tscheplak et al. | ......... 192/48.8 |

FOREIGN PATENT DOCUMENTS

| GB | 2207965 A | * | 2/1989 | ........... F16D/13/56 |
| JP | 04302715 A | * | 10/1992 | ........... F16D/23/12 |

* cited by examiner

Primary Examiner—Charles A Marmor
Assistant Examiner—Dennis Abdelnour
(74) Attorney, Agent, or Firm—Cohen, Pontani, Lieberman & Pavane

(57) ABSTRACT

A first clutch area produces a first torque-transmitting connection between a drive element and a first driven element, and a second clutch area produces a second torque-transmitting connection between the drive element and a second driven element. A common engaging/disengaging mechanism actuates the first clutch area and the second clutch area to produce and to nullify the first and second torque-transmitting connections.

11 Claims, 7 Drawing Sheets

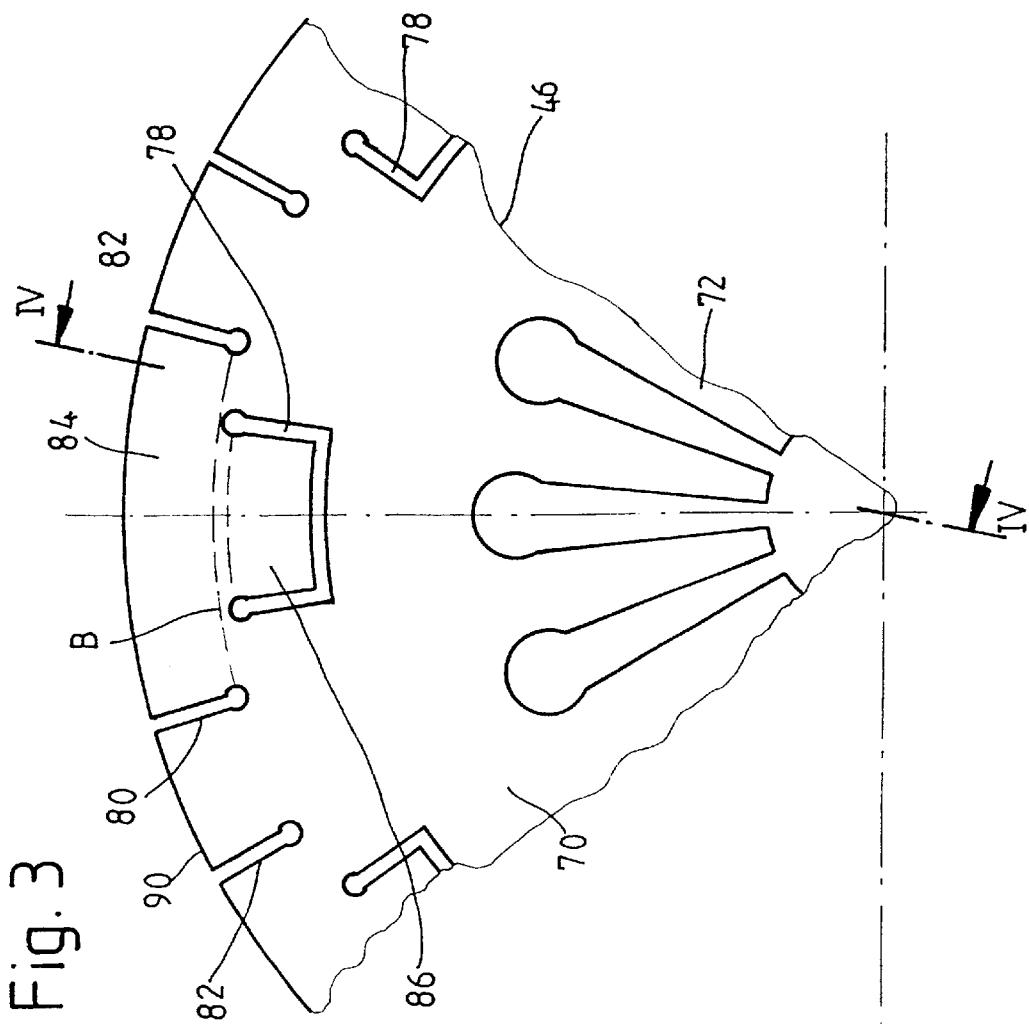
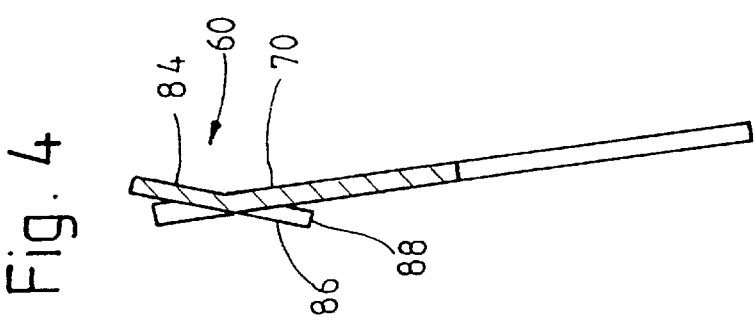

DOUBLE CLUTCH ASSEMBLY

BACKGROUND OF THE INVENTION

1. Field of the Invention

The present invention pertains to a double clutch assembly, comprising a first clutch area for the optional production of a first torque-transmitting connection between a drive element and a first driven element, and a second clutch area for the optional production of a second torque-transmitting connection between the drive element and a second driven element.

2. Description of the Related Art

Double clutch assemblies of this type are used, for example, in conjunction with variable gear transmissions which have two transmission input shafts. Different gear stages can be engaged, depending on which of the transmission input shafts is in the torque-transmitting path after actuation of the associated clutch area. To implement the engagements and disengagements of the clutch, it is known in double clutch assemblies of this type that each clutch area can have its own, separate engaging/disengaging mechanism, so that, depending on the actuation or activation of one of the engaging/disengaging mechanisms, one of the clutch areas can be disengaged while the other is or becomes engaged. This leads to a relatively complicated design, however, because the two engaging/disengaging mechanisms, such as engaging/disengaging piston-cylinder assemblies, must be installed in a small space and thus staggered radially with respect to each other.

SUMMARY OF THE INVENTION

The object of the present invention is to improve the double clutch assembly of the general type in question so that, with a simpler design for executing engagements and disengagements, the various clutch areas can be activated in a simplified manner.

This object is accomplished according to the invention by a double clutch assembly, comprising a first clutch area for the optional production of a torque-transmitting connection between a drive element and a first driven element and a second clutch area for the optional production of a torque-transmitting connection between the drive element and a second driven element. The first and second driven elements may be embodied as coaxially positioned transmission input shafts.

The double clutch assembly according to the invention has a common engaging/disengaging mechanism, by means of which the first and the second clutch area can be actuated to produce or to nullify the torque-transmitting condition.

According to the invention, therefore, the principle of providing a separate engaging/disengaging mechanism for each clutch area, these separate mechanisms then also being actuated separately, is abandoned. Instead, a single mechanism of this type is provided, which, depending on how it is actuated, can have the effect either of engaging one of the clutch areas while disengaging the other or of keeping both clutch areas in a state of partial torque transmission. This considerably simplifies both the design of a clutch assembly of this type and the measures required to actuate the clutch.

In accordance with the invention, it is then also provided preferably that, when one of the clutch areas has been actuated by the engaging/disengaging mechanism to produce the torque-transmitting condition, the other clutch area is actuated to nullify the torque-transmitting condition.

The double clutch assembly according to the invention can have, for example:

a first pressure plate for the first clutch area, this plate being provided with a first friction surface, which can be brought to rest against a first clutch disk assembly;

a second pressure plate for the second clutch area, this plate being provided with a first friction surface, which can be brought to rest against a second clutch disk assembly; and an essentially stationary intermediate disk assembly, which has, on one side, a second friction surface for the first clutch area and, on the other side, a second friction surface for the second clutch area, where, to create the torque-transmitting condition for the first clutch area, the first pressure plate can be moved toward the intermediate disk assembly and, to create the torque-transmitting condition of the second clutch area, the second pressure plate can be moved toward the intermediate disk assembly.

To minimize the actuation effort required to actuate the clutch assembly and to shift from one of the clutch areas to the other, the double clutch assembly according to the invention is provided with a force storage unit, by means of which one of the clutch areas is kept pretensioned in its torque-transmitting state.

A design which is very simple to build can be obtained in this case by providing the force storage unit with a first force storage element, which is or can be supported on one side against the pressure plate of the one clutch area and on the other side against a component which transmits the engaging force. By means of this engaging force-transmitting component, an engaging force can be transmitted from a force-generating mechanism to the pressure plate of the other clutch area.

So that both clutch areas can take equal advantage of the movements of the engaging force-transmission component when these two clutch areas are being engaged and disengaged, the part of the engaging force-transmission component which cooperates with the first force storage element can be moved away from the pressure plate of the one clutch area when an engaging force is transmitted to the pressure plate of the other clutch area.

The effort required to construct the clutch assembly and to actuate it to execute the various engagements and disengagements can be further simplified by providing the engaging force-transmission component with a second force storage element, which has an area which cooperates with the first force storage element, this area of the second component being pretensioned in the direction toward the pressure plate of one of the clutch areas. By keeping one of the clutch areas pretensioned in its torque-transmitting state, the only measure which must be taken to switch from the one clutch area to the other is to generate an actuating force in a single direction, whereas shifting back in the other direction can be accomplished simply by ceasing to generate this force.

To simplify the design even further, the first force storage element is permanently connected to the second force storage element, the two preferably being designed as a single unit. This can be realized, for example, by designing the first force storage element with a plurality of force storage sections projecting from the second force storage element toward the pressure plate of one of the clutch areas.

To ensure, in a double clutch assembly according to the invention, that the actuating characteristic and the clutch characteristic do not change over the service life of the system, that is, even after wear has occurred, the first force storage element cooperates with the pressure plate of one of the clutch areas and/or the engaging force-transmission component cooperate with the pressure plate of the other clutch area by way of wear compensation assemblies.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 3 shows a view, corresponding to that of FIG. 2, of an alternative design for a force storage unit, which simultaneously exercises the functions of two force storage elements;

FIG. 4 shows a cross-sectional view along line IV—IV of FIG. 3;

DETAILED DESCRIPTION OF THE PRESENTLY PREFERRED EMBODIMENTS

Figure 1:
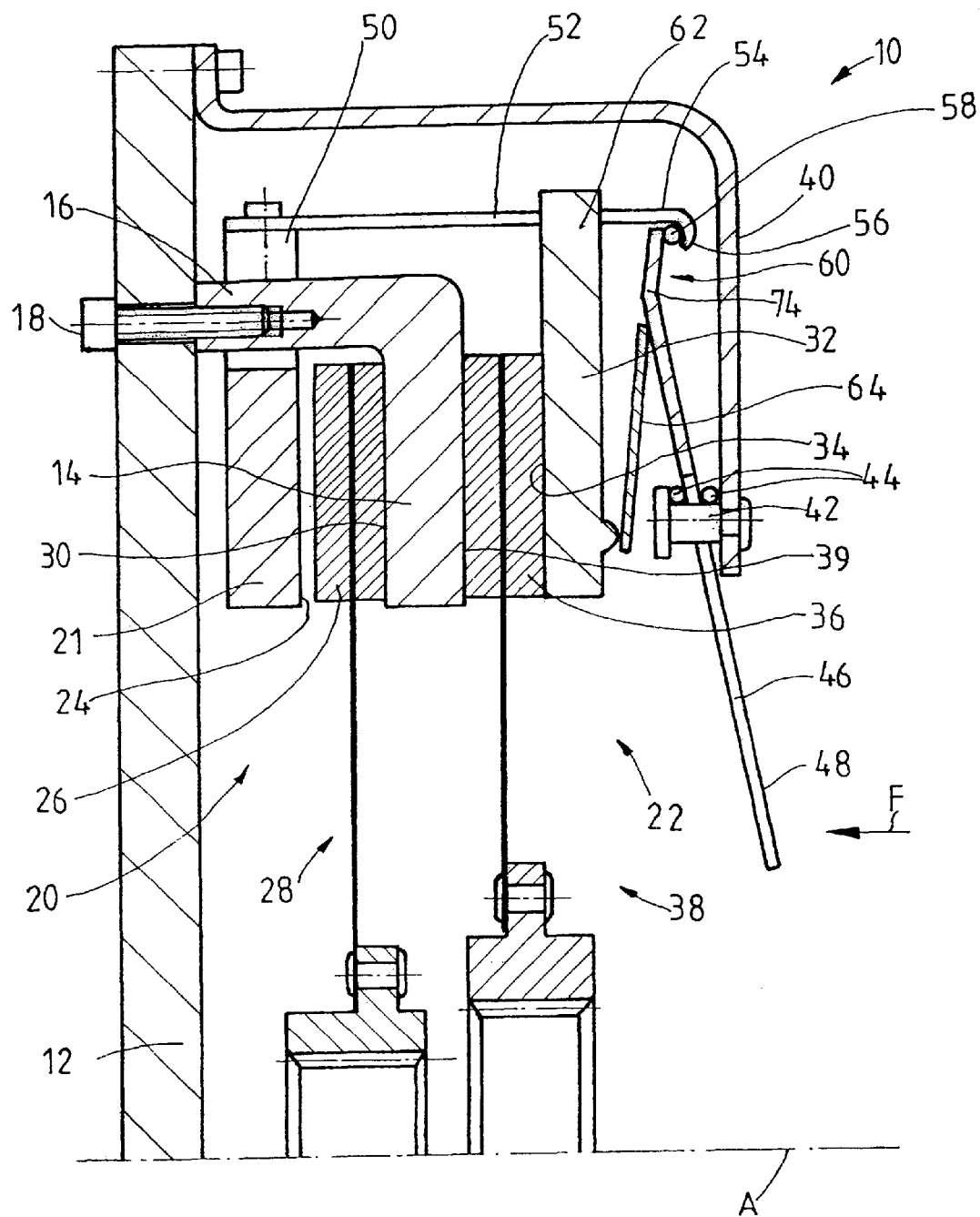
FIG. 1 shows a partial, longitudinal cross section through a first embodiment of a double clutch assembly according to the invention.

In FIG. 1, a double clutch assembly 10 includes a flywheel 12, which can be or is connected to a drive shaft (not shown) such as a crankshaft, for rotation in common with the shaft. In its radially outer area, an intermediate disk element 14 is rigidly connected to the flywheel 12; the cylindrical section 16 of this disk element is bolted by a plurality of threaded bolts 18 or the like to the flywheel 12. The intermediate disk element 14 works together equally with the two different clutch areas 20, 22 of the double clutch assembly 10.

The first clutch area 20 comprises a first pressure plate 21, the first friction surface 24 of which can be pressed against friction linings 26 of a clutch disk 28 of the first clutch area 20. When this happens, the friction linings 26 of the clutch disk 28 are pressed against a second friction surface 30 of the first clutch area 20, located on the intermediate disk element 14.

The double clutch assembly 10 also includes a second pressure plate 32 for the second clutch area 22. This second pressure plate 32 also has a first friction surface 34 of the second clutch area 22; this friction surface can be pressed against the friction linings 36 of the clutch disk 38 of the second clutch area 22, which then has the effect of pressing the friction linings 36 against a second friction surface 39 of the second clutch area 22, which is also located on the intermediate disk 14.

The two clutch disks 28, 38 can be connected to the input shafts of a gear transmission (not shown) for rotation in common with the shafts, for which purpose the hub areas of the disks can, for example, be provided with wedge-like teeth, which engage with corresponding teeth on the shafts. The transmission input shafts are preferably coaxial to each other and are supported to rotate around a rotational axis A.

On a housing 40, connected nonrotatably to the flywheel 12, a force storage element 46 in the form of a diaphragm spring, cup spring, etc., is carried by way of a plurality of spacer bolts 42, etc., and two wire rings 44 in the way normally used for clutches of the "push" type. An actuating force-generating mechanism can exert a force, illustrated by the force arrow F, on the radially inward end 48 of the force storage element 46, thus pushing it in the direction of the flywheel 12. As a result of the force acting on the spring, the radially outer area 60 of the force storage element 46 pivots away from the flywheel 12.

The radially outward-projecting sections 50 of the pressure plate 21 of the first clutch area 20 pass through axially oriented slots in the cylindrical section 16 of the intermediate disk element and are connected rigidly there to a connecting assembly 52. This connecting assembly 52 can be either an essentially circular cylindrical element or can comprise several connecting arm sections 54, extending essentially in the axial direction, which are bent over at the ends facing away from the pressure plate 21. In this bent end area 56, there is, for example, a radially outward-pretensioned wire ring 58, against which the radially outer area 60 of the force storage element 46 is supported. The pressure plate 32 of the second connecting area 22 also has several radially outward-projecting sections 62, which engage between the individual connecting arms 54 to create a nonrotatable connection between the two pressure plates 21, 32. It should be pointed out here that the two pressure plates 21, 32 can also be connected to the flywheel 12 and to the housing 40, respectively, by tangential leaf springs in such a way that they are essentially nonrotatable with respect to the intermediate disk element 14 but still have freedom of axial movement and are pretensioned, for example, in a position away from the intermediate disk element 14. These tangential leaf springs can also act between the intermediate disk element 14 and the respective pressure plates 21, 32 in such a way that, in a state in which the pressure plates 21, 32 in question is resting with frictional contact against its associated friction linings 26, 36, the slanted section of a spring extends between the intermediate disk element 14 and the pressure plates 21, 32. Since this slanted section is at a certain angle of inclination with respect to a plane orthogonal to the rotational axis A, it deflects the force as a result of the tractional effect, as a result which the respective pressure plates 21, 32 are pressed with even greater force against the associated clutch disk 28, 38.

Another force storage element 64, which could be, for example, a cup spring, is provided for the second clutch area 22. This force storage element 64 is supported in its inner radial area against the pressure plate 32 and in the radially outer area against the radially outer area 60 of the force storage element 46. If the force storage element 46 is now in the state shown in FIG. 1, in which it is not under the influence of the actuating force-generating mechanism, then its radially outer area 60 presses the force storage element 64 toward the pressure plate 32, which then presses the clutch disk 38 against the intermediate disk element 14. The force storage element 64 is thus under tension and produces essentially the pressing force for the second clutch area 22. If now, proceeding from the this state, the second clutch area 22 is disengaged and the first clutch area 20 is engaged, then the radially inner area 48 of the force storage unit 46 is acted on by a force F, so that its radially outer area 60 is pivoted away from the flywheel 12. This pivoting movement allows the force storage unit 64 to relax, that is, to assume a less slanted position, until ultimately there is no longer any pressure acting on the pressure plate 32. By the action of the tangential leaf springs, for example, this plate is then is lifted off the clutch disk 38. During the actuating movement, the radially outer area 60 of the force storage element 46, acting by way of the connecting assembly 52, carries the pressure plate 21 of the first clutch area 20 along with it, so that the first friction surface 24 of this plate approaches the friction linings 26 of the clutch disk 28. The clutch area 20 is then kept in engagement by the continued action of the force on the radially inner area of the force storage unit 46.

Figure 2:
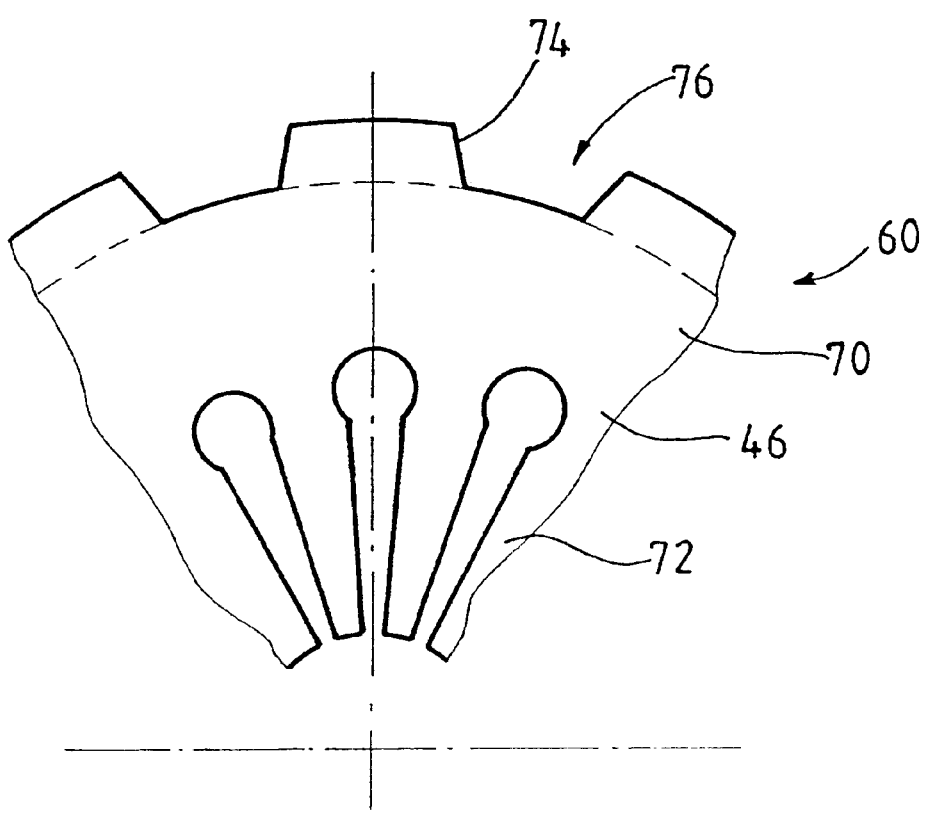
FIG. 2 shows an axial view of a segment of a force storage unit designed as a diaphragm spring, which can be used in the double clutch assembly of FIG. 1.

Through the suitable coordination of the spring characteristics of the two force storage elements 46, 64 with each other, it is possible to make sure that the torque increases gently upon the execution of clutch engagements and disengagements. It is also advantageous for the two force storage elements 46, 64 to be designed so that they have a relatively long actuating distance in the low force level range, as described in the following with reference to FIGS. 6 and 7, so that production tolerances or clutch wear occurring during operation will not lead to any significant change in the actuating or engagement characteristics. An embodiment of a force storage element 46, by means of which this type of spring characteristic can be obtained, that is, a spring characteristic with a flat curve in the low force range, is shown in FIG. 2. It can be seen here that elastic tongues 72 known in and of themselves project radially inward from a ring-shaped spring body 70, whereas several projections 74, which are distributed around the circumference, bent over slightly in the axial direction, and separated from each other by recesses 76, project radially outward from the area 60 of the force storage element.

Figure 6:
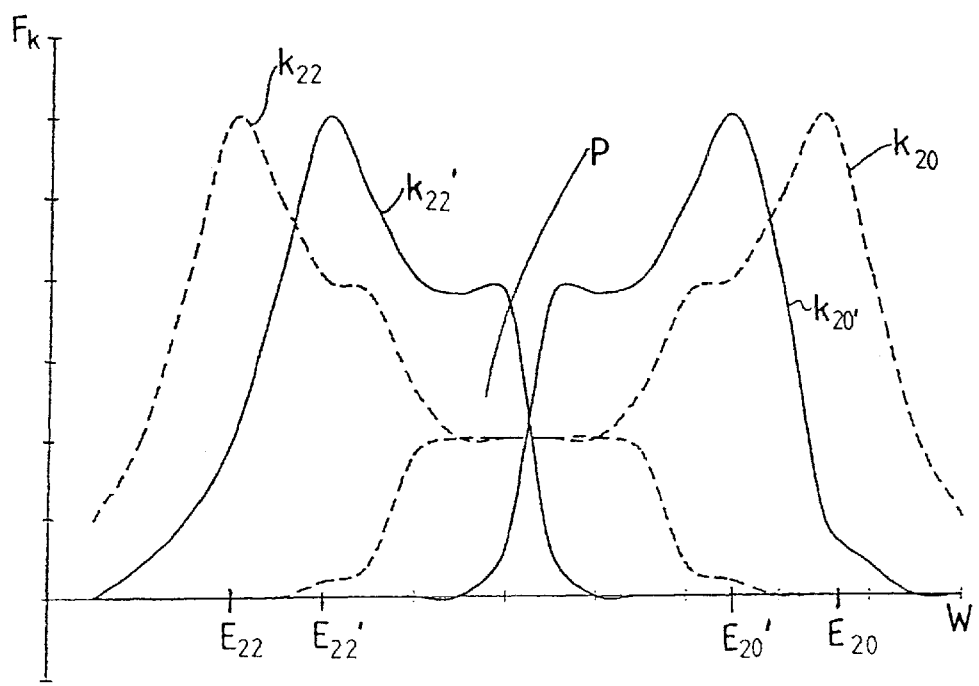
FIG. 6 shows a force-distance diagram, which illustrates the change in the forces being exerted by the various force storage elements during the execution of engagements and disengagements.

FIG. 6 shows a diagram of the change in the clutch force $F_K$ as a function of the actuating or engaging/disengaging distance W. Two alternative characteristic clutch curves are shown, one in solid line, the other in broken line; curve $K_{22}$ shows the change for clutch area 22, and curve $K_{20}$ shows the change for clutch area 20. $E_{22}$ is the point along the actuating distance axis ultimately reached in FIG. 1, i.e., the actuation position in which the clutch area 22 is fully engaged. It can be seen that the clutch force, which is determined ultimately by the force storage element 64 and its characteristic, has reached a maximum at this point. When a force is now applied to the radially inner end of the force storage unit 46, which is thus moved toward the flywheel 12, we can see a significant drop in the clutch force of the clutch area 22, whereas there is a gradual increase in the force in the clutch area 20. This gradual increase in force in clutch area 20 is caused by the presence of the bent projections 74 in the radially outer area 60 of the force storage element 46, which provide a certain elasticity in the path of force transmission to the pressure plate 21. In the variant shown in broken line, the two characteristic curves $K_{22}$ and $K_{20}$ are coordinated with each other in such a way that they have an overlapping plateau region P in a center part of the actuating distance curves between the two fully engaged positions $E_{22}$ and $E_{20}$. In this plateau region, neither of the two clutch areas 20, 22 is fully engaged, although it is still possible for each to transmit a certain drag torque. As a result of the presence of this plateau region P, the wear which occurs during operation can have only a slight or practically no influence on the clutch force occurring in this state, because a small shift along the distance axis W ultimately causes no change in the force. As force continues to be applied to the force storage element 46, the force transmitted to the clutch area 20 increases quickly, whereas, through the relaxation of the force storage element 64, the clutch force of the clutch area 22 decreases. Finally, the engaged position $E_{20}$ of the clutch area 20 is reached. The change in the clutch torque which is obtained with a clutch force curve of this type is shown in FIG. 7, also by the broken line.

Figure 7:
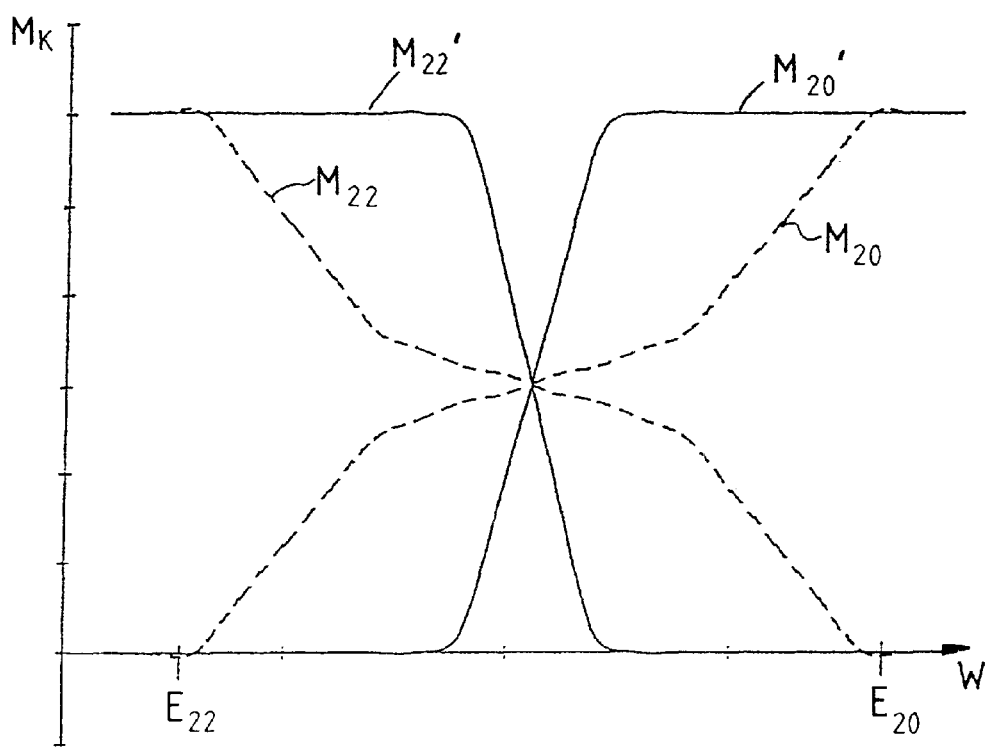
FIG. 7 shows a clutch torque-distance diagram, which, in agreement with the diagram of FIG. 6, illustrates the clutch torques which occur during the execution of clutch actuations.

The curves for the change in force and torque shown in FIGS. 6 and 7 by the solid lines, namely, $K_{22}'$, $K_{20}'$ and $M_{22}'$, $M_{20}'$ illustrate the case in which there is almost no plateau region P. This leads to a situation in which even very small shifts caused by wear can indeed bring about a change in the clutch force behavior, especially under conditions in which neither of the clutches is completely engaged, but in compensation the two engaged positions $E_{22}'$ and $E_{20}'$ move much closer together, which means that the total actuating distance can be reduced.

An alternative design for the force storage unit 46 is shown in FIGS. 3 and 4. This force storage unit 46 combines in itself the two force storage elements 46, 64, which were described above with reference to FIG. 1. It can be seen here that the ring-shaped area 70 of the force storage element 46 is provided with several essentially U-shaped slots 78, the open part of the U facing toward the outside; these slots can be formed by punching, for example. Each slot 78 is associated with a pair of straight slots 80, 82, which are open radially toward the outside and extend radially inward; there is one of these slots on each side of the U-shaped slot 78. The inside end of each of these straight slots terminates at the same level where the radially outward-pointing ends of the sidepieces of the U-shaped slot 78 terminate. This has the effect of creating a bending line B, and the plastic bending of the unit along this bending line B thus allows the area 84, which is radially outside the bending line B, to form a contact area, by which the force storage element 46 can rest on the wire ring 58. At the same time, the area 86, which is radially inside the bending line B, can come to rest against the pressure plate 32 by its radially inward end 88. This area 86 is therefore able to replace the force storage element 64 of FIG. 1. An integral force storage assembly is thus obtained, which simplifies considerably the process of assembling a clutch mechanism of this type. The configuration can be such that, even when the clutch area 22 is fully engaged, the sections 86 are still not pressed completely into the plane of the ring-shaped area 70 of the force storage unit 46. As an alternative, however, it is also possible to bend the sections 86 so far over or, for example, to design them with such a circumferential dimension that, even before the maximum pressure has been applied, they are pushed into the plane or so close to the plane of the ring-shaped body 70 that the remaining area of the force storage element 46 arrives directly in contact with the pressure plate 32. Such contact can be established, for example, by the radially outward area of the tabs 90 formed between each pair of slots 80, 82 and possibly also (when, for example, a raised contact ridge or the like as shown in FIG. 1 is provided on the pressure plate 32) by an area situated near the radially inner end 88 of the sections 86. It is thus possible to obtain a spring characteristic which can act advantageously on the clutch actuation process, as shown in FIG. 6. When a transition is to be made from the engaged position of the clutch area 22 to the engaged position of the clutch area 20 and a force is therefore exerted on the pressure plate 21, the bent areas 84 are the first to be actuated. If the force increases sufficiently, the entire circumferential area, i.e., including the tabs 90 of the force storage unit 46, comes to rest against the wire ring 58 and thus, as soon as the plateau P is passed, the clutch area 20 experiences a rapid increase in force.

It should also be remarked that FIG. 1 shows a clutch which, in terms of its actuation principle, corresponds basically to a "push" type of clutch; that is, pressure is exerted radially inward on the force storage unit 46 in order to disengage the clutch area 22, which is basically pretensioned by the force storage element 46 to remain in its torque-transmitting state. It is also possible, of course, for the radially outside part of the force storage element 46 to be supported on the housing 40, for example, and to design a force storage element of the "pull" type, in which the actuating force for disengaging the clutch area 22 must be applied in the opposite direction, that is, away from the flywheel 12.

Figure 5:
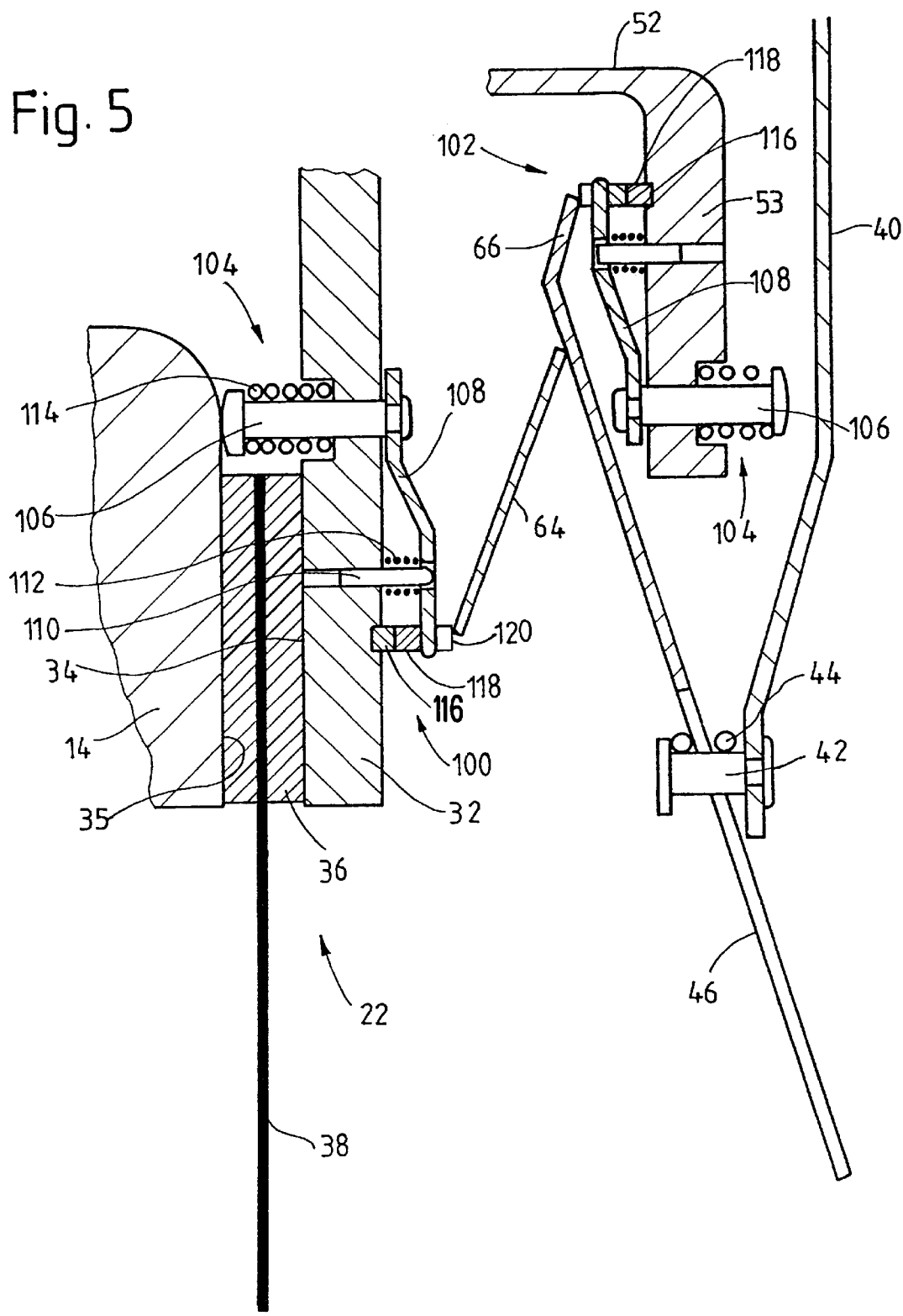
FIG. 5 shows an enlarged, detailed view of the double clutch assembly shown in FIG. 1, where a wear-compensation assembly is also provided.

FIG. 5 shows a design variant of the double clutch assembly according to the invention, in which wear compensation mechanisms 100, 102 are associated with both the first clutch area 20 and the second clutch area 22. The two wear compensation mechanisms 100, 102 are essentially of the same design, so that their construction is described in the following on the basis of wear compensation mechanism 100 alone. This wear compensation mechanism 100 comprises at least one play-providing device 104, which has a gripping section 106, which passes through the pressure plate 32 and which can come to rest against the intermediate disk element 14. A lever element 108 connected to the gripping section extends radially inward and is secured against rotation by a pin element 110, which passes through an appropriate hole in the lever element 108. The pin element 110 is surrounded by a compression spring 112, which is supported at one end against the pressure plate 32 and at the other end against the lever element 108 and which thus preloads the gripping section 106 against the pressure plate 32 or a pass-through opening provided in it to create a friction-locked connection. In addition, the gripping section 106 is also surrounded by a compression spring element 114, which preloads the gripping section in the direction of the intermediate disk element 14. At the radially inside end, the lever element 108 extends over two adjusting rings 116, 118 and engages in a circumferential recess 120 in the adjusting ring 118, so that this ring is prevented from rotating. The adjusting ring 116 is basically free to rotate and is preloaded for rotation in the circumferential direction with respect to the adjusting ring 118 by a preloading spring or the like. The two rings 116, 118 rest against each other by way of slanted surfaces, so that a relative rotation of the two adjusting rings 116, 118 with respect to each other leads to an axial expansion of the assembly formed out of these two rings 116, 118. The cup spring 64 acts on the adjusting ring 118 and, by pushing it, also pushes the pressure plate 32 toward the clutch disk 38. When, as a result of their rotation, the friction linings 36 are worn down, the gripping section 106 now comes to rest against the intermediate disk element 14, which means that the friction-locked connection between the gripping section 106 and the pressure plate 32 is disconnected, and the entire play-providing device 104 is shifted with respect to the pressure plate 32. Thus the lever element 108 rises up off the adjusting ring 118. Because, in the engaged state of this clutch area, the force storage unit 64 is still exerting force on the adjusting rings 116, 118, they cannot execute any relative rotational movement. Only in the course of a disengaging process, after the force storage unit 64 has released the adjusting ring 118 or the actuating force has decreased sufficiently, is the preload force sufficient at this point to rotate the two rings 116, 118 with respect to each other until, as a result of the axial expansion which occurs, the adjusting ring 118 comes up against the play-providing device 104, that is, against the lever element 108 thereof, the play-providing device now being locked frictionally in place again. At this point, the wear previously registered by the displacement of the play-providing device 104 has been compensated exactly.

The wear compensation mechanism 102, which compensates for any wear-induced displacement of the pressure plate 21 and thus of the clutch assembly 52 in the direction of the housing 40, functions in a similar manner. When, namely, the play-providing device 104, that is, the gripping section 106 of this device, strikes the housing 40, the lever element 108 against rises from the adjusting rings 116, 118. This, again, occurs as the clutch area 20 is in the process of becoming engaged, that is, while force is being exerted on the radially inside end of the force storage element 46 and the radially outside area 60 is approaching the housing 40. When a disengaging process then follows, that is, when the force storage element 46 relaxes again and thus reduces or nullifies the actuation of the adjusting ring 118, the adjusting rings 116, 118 can rotate again with respect to each other in the circumferential direction until the adjusting ring 118 strikes the lever element 108.

As a result of the wear compensation mechanisms 100, 102 described above, it can be ensured that the two force storage elements 46, 64, which could also be replaced by the force storage element shown in FIG. 3, will always be held in the same installation position regardless of any wear which occurs, so that a uniform clutch characteristic, which remains the same over the entire service life of the unit, is present. It should be pointed out that other types of wear compensation mechanisms could be used in this area; in place of the adjusting rings rotating in the circumferential direction, it would also be possible to use wedge-like elements, which shift in the radial direction, or one of the adjusting rings could be replaced by ramp surfaces, provided on the pressure plate or the radially inward-pointing, flange-like section 53 of the connecting assembly 52. It is obvious that several of these play-providing devices 104 could be distributed around the circumference.

Figure 8:
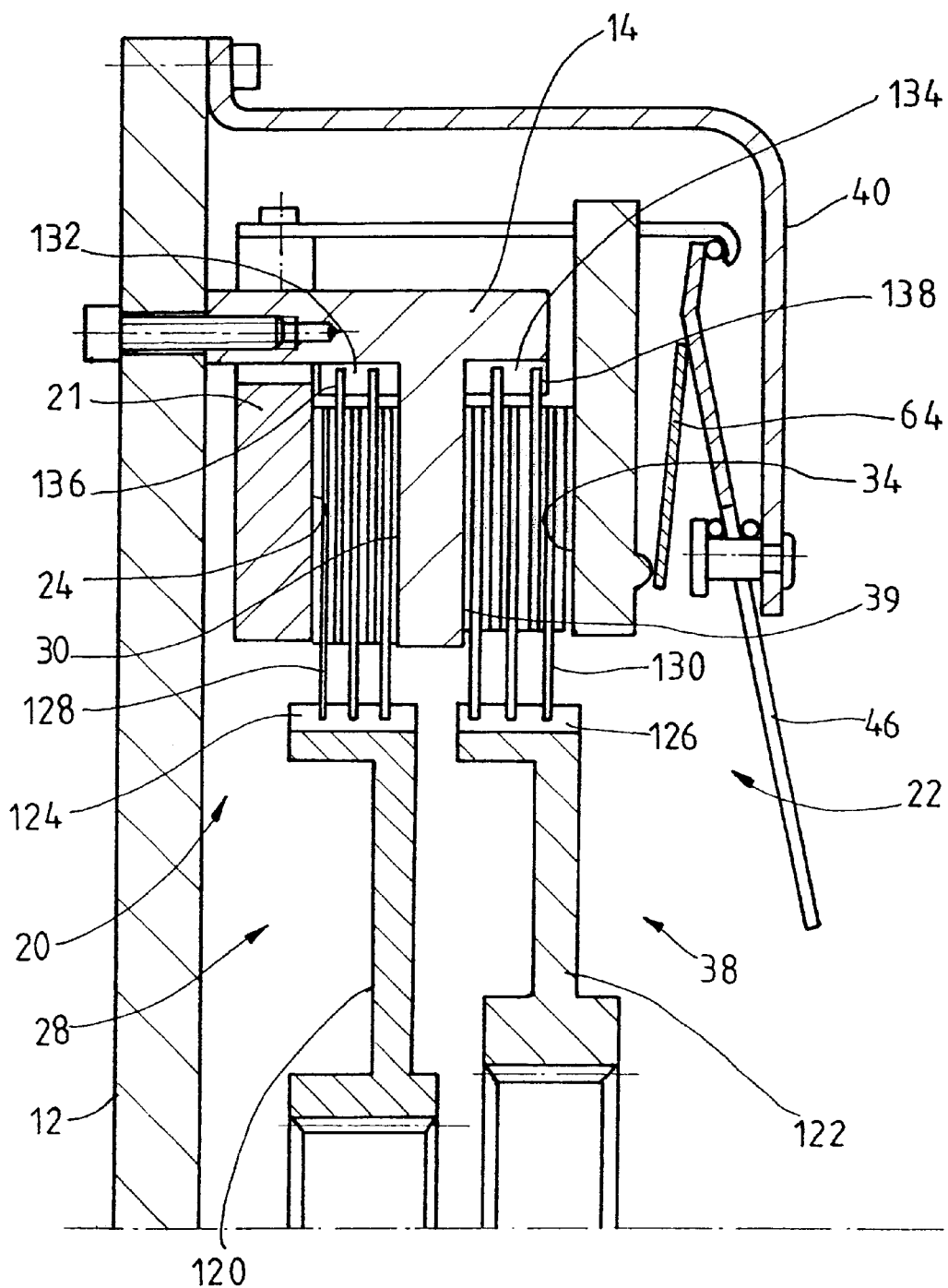
FIG. 8 shows an alternative design possibility of a double clutch assembly according to the invention, this time in the form of a wet-running clutch.

Another modification of the double clutch assembly according to the invention is shown in FIG. 8. The diagram of FIG. 8 shows a wet-running clutch, in which the clutch disks 28, 38 now have carriers 120, 122 for internal plates. The carriers are provided with sets of teeth 124, 126, extending in the axial direction. By these teeth, the carriers are connected nonrotatably at the radially outward end to the internal plates 128, 130. Corresponding teeth 132, 134, pointing radially inward, are provided on the intermediate disk element 14. The external plates 136, 138 are connected nonrotatably but with freedom of axial movement to these external teeth. Friction linings are provided on the inside plates 128, 130 and/or on the outside plates 136, 138, so that, in the engaged state of the clutch areas 20, 22, the external and internal plates grip each other frictionally, and the assemblies of plates are clamped between the friction surfaces 24, 30 of the first clutch area 20 or between the friction surfaces 34, 39 of the second clutch area. Obviously, a wet-running clutch assembly of this type can be installed in a sealed housing, which encloses it completely in a leakproof manner. With respect to the design and interaction of the force storage units 46, 64, reference can be made to the preceding discussion.

Embodiments have been described above in which both clutch areas of a double clutch assembly can be operated by a single engaging/disengaging mechanism. It is obvious that several different variants are possible here without departing from the principle of the invention. For example, the flywheel 12 could be designed as a double-weighted flywheel, or torsional vibration dampers could be integrated into the individual clutch disks 28, 38. In addition, the orientation of the friction linings does not have to be precisely radial; the linings can also be at a certain angle with respect to the radial direction. It is also possible to combine a double clutch assembly of this type with a crankshaft-starter-generator system.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A double clutch assembly comprising
   a first clutch area for the production of a first torque-transmitting connection between a drive element and a first driven element, said first clutch area comprising a first pressure plate,
   an engaging force-transmitting component for transmitting an engaging force generated by a force generating mechanism to the first pressure plate, whereby said first clutch area can be actuated to produce the first torque transmitting connection,
   a second clutch area for the production of a second torque-transmitting connection between the drive element and a second driven element, said second clutch area comprising a second pressure plate,
   a first force storage element having one end supported against the second pressure plate and an opposite end supported against the engaging force-transmitting component, whereby said second clutch area can be actuated to produce said second torque transmitting connection,
   a common engaging/disengaging mechanism for actuating said first and second clutch areas to produce and to nullify the first and second torque-transmitting connections.

2. A double clutch assembly as in claim 1 wherein said engaging/disengaging mechanism actuates one of said first and second clutch areas to produce one of said first and second torque-transmitting connections while it actuates the other of said first and second clutch areas to nullify the other of said first and second torque-transmitting connections.

3. A double clutch assembly as in claim 1 further comprising an essentially stationary intermediate disk assembly between said first and second clutch areas,
   said first clutch area further comprising a first clutch disk assembly located between said first pressure plate and said intermediate disk assembly, the first pressure plate being movable toward the intermediate disk assembly to produce the first torque-transmitting connection,
   said second clutch area further comprising a second clutch disk assembly located between said second pressure plate and said intermediate disk assembly, the second pressure plate being movable toward the intermediate disk assembly to produce the second torque-transmitting connection.

4. A double clutch assembly as in claim 1 wherein said common engaging/disengaging mechanism comprises a force-storage unit which pretensions either one of said first and second clutch areas to maintain a respective one of said first and second torque-transmitting connections.

5. A double clutch assembly as in claim 4 wherein said force-storage unit comprises said engaging force-transmitting component and said first force storage element.

6. A double clutch assembly as in claim 5 wherein said engaging force-transmitting component comprises an area against which said first force storage element is supported, said area moving away from said second pressure plate when said engaging force is transmitted to said first pressure plate.

7. A double clutch assembly as in claim 5 wherein said engaging force-transmitting component comprises a second force storage element having an area against which said first force storage element is supported, said area being pretensioned toward said second pressure plate.

8. A double clutch assembly as in claim 7 wherein said first force storage element is permanently connected to said second force storage element.

9. A double clutch assembly as in claim 8 wherein said first and second force storage units are formed as a single component, said first force storage element comprising a plurality of force storage sections which project from the second force storage element toward the second pressure plate.

10. A double clutch assembly as in claim 5 further comprising a wear compensation assembly between said engaging force-transmitting component and said first pressure plate.

11. A double clutch assembly as in claim 5 further comprising a wear compensation assembly between said first force storage element and said second pressure plate.

* * * * *